(12) United States Patent
Saha et al.

(10) Patent No.: US 12,288,138 B2
(45) Date of Patent: Apr. 29, 2025

(54) EXPLANATION FOR TIME SERIES FORECASTING MODELS

(71) Applicant: International Business Machines Corporation, Armonk, NY (US)

(72) Inventors: Diptikalyan Saha, Bangalore (IN); Philips George John, Kottayam (IN); Vitobha Munigala, Secunderabad (IN)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 17/017,836

(22) Filed: Sep. 11, 2020

(65) Prior Publication Data

US 2022/0083897 A1    Mar. 17, 2022

(51) Int. Cl.
   *G06N 20/00*       (2019.01)
   *G06F 16/2458*     (2019.01)
   *G06F 16/904*      (2019.01)

(52) U.S. Cl.
   CPC ......... *G06N 20/00* (2019.01); *G06F 16/2477* (2019.01); *G06F 16/904* (2019.01)

(58) Field of Classification Search
   CPC .... G06N 20/00; G06F 16/2477; G06F 16/904
   USPC .......................................................... 706/12
   See application file for complete search history.

(56) References Cited

U.S. PATENT DOCUMENTS

| 9,740,181 B2 | 8/2017 | Holub et al. | |
| 10,140,161 B1* | 11/2018 | Singh | G06F 9/5083 |
| 2018/0239829 A1* | 8/2018 | Dialani | G06Q 10/1053 |
| 2019/0156196 A1* | 5/2019 | Zoldi | G06N 3/08 |
| 2019/0244122 A1* | 8/2019 | Li | G06N 5/022 |

FOREIGN PATENT DOCUMENTS

CN        105956690 A        9/2016

OTHER PUBLICATIONS

Ribeiro, M. T., Singh, S., & Guestrin, C. (Aug. 2016). "Why should i trust you?" Explaining the predictions of any classifier. In Proceedings of the 22nd ACM SIGKDD international conference on knowledge discovery and data mining (pp. 1135-1144). (Year: 2016).*

(Continued)

*Primary Examiner* — Brian M Smith
(74) *Attorney, Agent, or Firm* — Yee & Associates, P.C.

(57) ABSTRACT

A method, system, and computer program product for explaining predictions made by black box time series models. The method may include identifying a black box time series model. The method may also include predicting one or more time instances using the black box time series model. The method may also include selecting a predicted time instance from the predicted data. The method may also include receiving training data for the black box time series model. The method may also include generating a set of white box time series models similar to the black box time series model. The method may also include selecting a preferred white box time series model. The method may also include analyzing behavior of the preferred white box time series model. The method may also include generating an explanation illustrating why the black box time series model forecasted the predicted time instance.

19 Claims, 6 Drawing Sheets

(56) References Cited

OTHER PUBLICATIONS

He, K., Chen, X., Wu, Q., Yu, S., & Zhou, Z. (2020). Graph attention spatial-temporal network with collaborative global-local learning for citywide mobile traffic prediction. IEEE Transactions on mobile computing, 21(4), 1244-1256. (Year: 2020).*
Smith, C., & Jin, Y. (2014). Evolutionary multi-objective generation of recurrent neural network ensembles for time series prediction. Neurocomputing, 143, 302-311. (Year: 2014).*
Hyndman, R. J., & Khandakar, Y. (2008). Automatic time series forecasting: the forecast package for R. Journal of statistical software, 27, 1-22. (Year: 2008).*
Moeeni, H., Bonakdari, H., & Fatemi, S. E. (2017). Stochastic model stationarization by eliminating the periodic term and its effect on time series prediction. Journal of hydrology, 547, 348-364. (Year: 2017).*
Britton, M., "VINE: visualizing statistical interactions in black box models," downloaded from <arxiv.org/abs/1904.00561> (Apr. 1, 2019) 11 pp. (Year: 2019).*
Li, H. et al., "A modified LIME and its application to explain service supply chain forecasting," CCF Intl. Conf. on Natural Language Processing and Chinese Computing (Sep. 30, 2019) 8 pp. (Year: 2019).*
Viana, F.A.C. et al., "Multiple surrogates: how cross-validation errors can help us to obtain the best predictor," Struct. Mutlidisc. Optim., vol. 29 (2009) pp. 439-457. (Year: 2009).*
Fang, Z. et al., "Efficient learning interpretable shapelets for accurate time series classification," 2018 IEEE 34th Intl. Conf. on Data Engineering (2018) pp. 497-508. (Year: 2018).*
Pappalardo et al., "Explainable Injury Forecasting via Multivariate Time Series and Convolutional Neural Networks," Research Gate, Nov. 2019, 32 pages, https://www.researchgate.net/publication/337275840.
"Interpretable Machine Learning," 5.6 Global Surrogate, Apr. 14, 2020, 6 pages https://christophm.github.io/interpretable-ml-book/index.html.
Wichard et al., "Time Series Prediction with Ensemble Models," Department of Electrical Engineering, AGH University of Science and Technology, Printed Sep. 8, 2020, 6 pages http:/citeseerx.ist.psu.edu/viewdoc/download?doi=10.1.1.61.7659&rep=rep1&type=pdf.
"Summary of rules for identifying ARIMA models," ARIMA, Printed Sep. 9, 2020, 2 pages https://people.duke.edu/~mau/arimrule.htm.
Hyndman et al., "Automatic Time Series Forecasting: The forecast Package for R," Journal of Statistical Software, Jul. 2008, vol. 27, Issue 3, 22 pages, https://www.jstatsoft.org/article/view/v027i03.
Karlsson et al., "Explainable Time Series Tweaking via Irreversible and Reversible Temporal Transformations," Sep. 13, 2018, arXiv:1809.05183v1 [cs.LG], 10 pages (https://arxiv.org/pdf/1809.05183.pdf).
Lindgren et al., "Example-based feature tweaking using random forests," IEEE, 2019 IEEE 20th International Conference on Information Reuse and Integration for Data Science (IRI), 2019, Downloaded on May 26, 2020, 8 pages, DOI 10.1109/IRI.2019.00022.
Giurgiu et al., "Explainable Failure Predictions with RNN Classifiers based on Time Series Data," Jan. 20, 2019, 8 pages, arXiv:1901.08554v1 [cs.LG].
Karlsson et al., "Locally and globally explainable time series tweaking," Knowledge and Information Systems (2020), Published online Aug. 30, 2019, 30 pages, https://doi.org/10.1007/s10115-019-01389-4.
Pang Wei Koh et al., "Understanding Black-box Predictions via Influence Functions," Proceedings of the 34th International Conference on Machine Learning, Sydney, Australia, PMLR 70, 2017, 11 pages, arXiv:1703.04730v2.
Craven et al., "Extracting Tree-Structured Representations of Trained Networks," Computer Sciences Department, University of Wisconsin-Madison, Printed Sep. 8, 2020, 7 pages.
"Slundberg/Shap," GitHub, Printed Sep. 8, 2020, 3 pages, https://github.com/slundberg/shap.
Ribeiro et al., "Why Should I Trust You?" Explaining the Predictions of Any Classifier, Feb. 16, 2016, 15 pages, arXiv:1602.04938v1 [cs.LG].
Craven et al. "Understanding Time-Series Networks: A Case Study in Rule Extraction", International Journal of Neural Systems, Aug. 1, 1997, pp. 373-384, vol. 8, No. 4.

* cited by examiner

EXPLANATION FOR TIME SERIES FORECASTING MODELS

BACKGROUND

The present disclosure relates to time series models and, more specifically, to using training data and similar white box time series models to explain predictions made by black box time series models.

When predicting using machine learning technology, time may not be considered or may only be minimally considered during the prediction. For instance, the past data may be considered at an equal weight and the predictions made may simply be for some future date. However, in some instances, times that the past data occurred and times that the model is forecasting for may be considered. Therefore, there may be a time component to the prediction. The data, when time is a component, may be represented in a time series. A time series may include data that is listed, graphed, displayed, etc. in time order. Time series forecasting may use the time series and a machine learning model and predict future data for the time series.

SUMMARY

The present invention provides a computer-implemented method, system, and computer program product to use training data and similar white box time series models to explain predictions made by black box time series models. The method may include identifying a black box time series model. The method may also include predicting one or more time instances using the black box time series model, resulting in predicted data. The method may also include selecting a predicted time instance from the predicted data. The method may also include receiving training data for the black box time series model. The method may also include generating a set of white box time series models similar to the black box time series model. The method may also include selecting a preferred white box time series model from the set of white box time series models based on a difference between each white box time series model and the black box time series model. The method may also include analyzing behavior of the preferred white box time series model. The method may also include generating, based on the analyzing and the training data, an explanation illustrating why the black box time series model forecasted the predicted time instance. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to time series models and, more specifically, to using training data and similar white box time series models to explain predictions made by black box time series models. While the present disclosure is not necessarily limited to such applications, various aspects of the disclosure may be appreciated through a discussion of various examples using this context.

Time series forecasting may use machine learning models to predict, or forecast, future data in the time series. Because time is a specific component that is being considered, time series forecasting models may be more complex (due to the additional time factor) than conventional machine learning models, but may also be more accurate.

In some instances, time series forecasting models may be black box models. Black box models are models in which the internal workings are unclear and/or inaccessible. For example, a neural network may be a black box model as the internal workings may be unclear and hard to understand. Other examples of black box models may include gradient boosting models, proprietary models, complex models, etc. In some instances, only the inputs and outputs of a black box model (e.g., a black box time series forecasting model) may be visible and/or accessible. However, it may be unclear how and/or why the model forecasted the data it did. When there is no explanation for the forecasting model (for example, because it is a black box model), there may be no way, or at least it may be difficult, to fix any errors in the forecasting model. Existing conventional methods, such as time series explainability, only address and are only applicable to time series classification (i.e., classifying multiple time series into a class or classes).

The present invention provides a computer-implemented method, system, and computer program product to use training data and similar white box time series models to explain predictions made by black box time series models. Determining an explanation for the predictions made by the black box time series model may increase debugging capabilities of the model. For instance, the explanations may be used to determine incorrect predictions and find parameters, training data, etc. that may be responsible for incorrect predictions by the black box model. Additionally, determining an explanation for the predictions may increase trust in the model because there may be accessible explanation and analysis of why the model is predicting/forecasting the points that it is.

In some instances, an explanation for a specific data point forecasted by the black box time series model may be determined. The forecasted point, the overall forecasted data (for example, a set of forecasted points) predicted by the black box time series model, and the original time series data and training data that were used to create and train the black box time series model may all be used to build and train white box time series models similar to the black box time series model. In some embodiments, the white box time series models are created on the time instances in the training data of the black box time series model and using the predictions of the black box time series model. In some instances, the black box time series model may not strictly follow the values from the training data, therefore the black box time series model predictions may be used to create the white box time series models in order to more accurately imitate the black box time series model. Once the white box time series models are created, they may be compared to the black box time series model to determine how similar each model is to the black box time series model. In some instances, each white box time series model may be compared to the black box time series model at the specific forecasted data point (that the explanation may be determined for) and as a whole. A white box time series model may be selected from the set of white box time series models as the preferred white box time series model. The preferred white box time series model and the time series data (for the black box time series model) may be used to generate an explanation for the specific forecasted data point (referred to herein as a predicted time instance). In some instances, the explanation may include trends and seasonality of the data forecasted by the black box time series model. Additionally, in some instances, the explanation may include data points from the black box time series model that were determined to be important to the forecasting of the predicted time instance.

Figure 1:
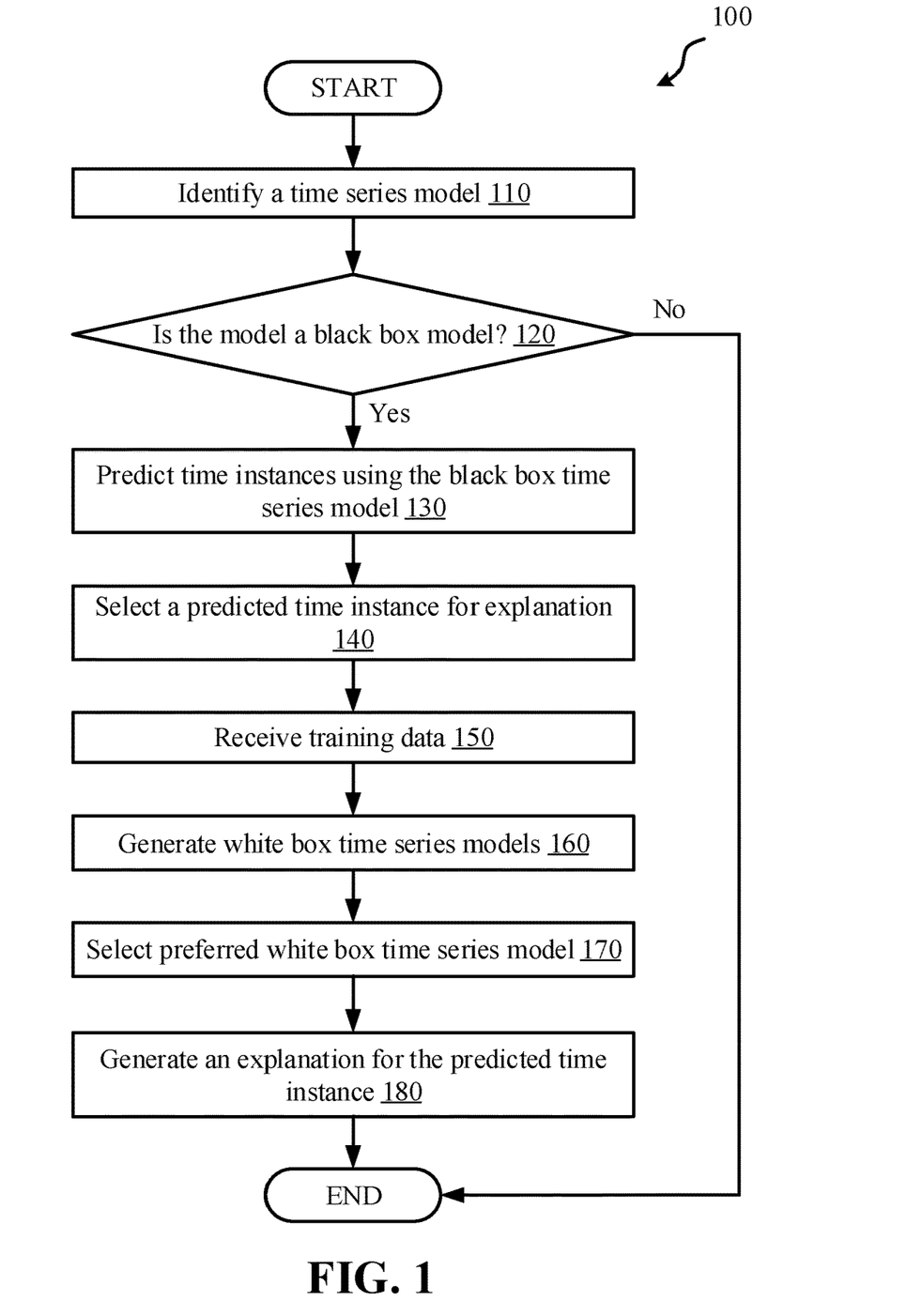
FIG. 1 depicts a flowchart of a set of operations for explaining predictions made by black box time series models, according to some embodiments.

Referring now to FIG. 1, a flowchart illustrating a method 100 for explaining predictions made by black box time series models is depicted, according to some embodiments. In some embodiments, method 100 is executed by a server (e.g., computer system/server 602 (FIG. 6)) on or connected to a computer system (e.g., computer system 600 (FIG. 6)). In some embodiments, the method 100 is implemented as a computer script or computer program (e.g., computer executable code) to be executed on or connected to the computer system. In some embodiments, the method 100 is executed by a processor (e.g., processor 205 (FIG. 2) and/or processing unit 610 (FIG. 6)) on or connected to a computer system (e.g., computer system 600 (FIG. 6)).

Method 100 includes operation 110 to identify a time series model. As discussed herein, a time series may include data that is listed, graphed, displayed, etc. in chronological order. A time series model may be a model (e.g., an algorithm or series of algorithms) that fits the time series, in some instances. In some embodiments, the time series model is a machine learning time series model. In some embodiments, the time series model is a forecasting model. In some embodiments, the time series model is a univariate time series model.

Method 100 includes operation 120 to determine whether the model is a black box model. A black box model may be a model with unclear and/or inaccessible internal workings. For instance, it may be difficult or even impossible to determine why a black box model generated a certain output or made a particular conclusion based on a set of data. In some embodiments, determining whether the model is a black box model includes attempting to analyze or interpret the model. If the time series model can be interpreted and analyzed (for example, if the internal workings and information for the time series model are accessible), the time series model may be a white box model and may not be a black box model. If the time series model cannot be interpreted and/or analyzed (for example, if the internal workings and information for the time series model are not accessible), the time series model may be a black box model. If the time series model is a black box model (meaning that it cannot be interpreted and/or analyzed), it may be unknown why the black box model predicted the data that it did. Therefore, an explanation may need to be generated in order to explain and/or illustrate the prediction(s) made by the black box model (for example, explaining a specific data point that was predicted by the black box time series model). In some embodiments, the explanation may include seasonality and/or other trends of the time series data. In some embodiments, the explanation may include residual and/or other errors of the black box time series model compared to the actual time series data. Seasonality, trends, errors, etc. may help demonstrate why the black box time series model predicted the certain data point(s) (i.e., predicted time instance(s)).

In some embodiments, if it is determined, in operation 120, that the model is not a black box model, method 100 may end. If it is determined that the model is a black box model (in operation 120), then a black box time series model may be identified, and method 100 may proceed to operation 130.

Method 100 includes operation 130 to predict time instances using the black box time series model. In some embodiments, the black box time series model is a prediction model (for example, a machine learning prediction model). Therefore, in some embodiments, the black box time series model may be created to, or at least have the capability to, forecast or predict future time series data. For example, the black box time series model may predict airplane ticket sales and the future times those airplane ticket sales may occur. In some embodiments, the black box time series model uses time series data to train the model and the trained model then forecasts future time instances at which an event (for example, the ticket sales) may occur. In some instances, the one or more time instances predicted using the black box time series model may be referred to herein as predicted data.

Method 100 includes operation 140 to select a predicted time instance from the predicted data for explanation. As discussed herein, the black box time series model (for example, after being trained using time series training data) may predict future time instances. However, due to the black box nature of the time series model, it may be difficult to, or there may be no way to, determine why the black box time series model forecasted the future time instances (or, "predicted data") it did. Therefore, in some instances, a specific time instance from the predicted data may be selected for explanation. For example, the predicted data may show an average household income from January 2022 through January 2023. There may be multiple forecasted time instances between January 2022 and January 2023. In this example, a specific forecasted data point of $70,000 in June 2022 may be selected for explanation. Therefore, the system may generate an explanation of why the black box time series model determined that the average household income would be $70,000 in June 2022. In this example, $70,000 in June 2022 is the specific time instance.

In some embodiments, a user selects the specific predicted time instance for explanation. In some embodiments, the specific predicted time instance may be automatically selected by the computer system. For example, the system may select a most recent predicted time instance for explanation. In some embodiments, a plurality of predicted time instances may be selected for explanation. For example, there may be multiple predicted time instances that a user, or the system, may want explanation for.

Method 100 includes operation 150 to receive training data for the black box time series model. The training data may be the actual data used to train the black box time series model. As discussed herein, the black box time series model may use training data (for example, time series data) to build and train the black box time series model. In some instances, the training data may include a set of time series data from the past and/or present (i.e., not the future) that was used to build and train the black box time series model. Put differently, the training data may include actual time series data (i.e., not predicted time series data), in some instances. In some embodiments, the black box time series model may be built and trained on a computer system connected to the system executing method 100. In such embodiments, receiving the training data for the black box time series model may include receiving time series training data from the computer system that built and trained the black box time series model. In some embodiments, the black box time series model may be built and trained on the computer system executing method 100. In such embodiments, receiving the training data for the black box time series model may include accessing and/or requesting the training data (i.e., time series data) from a server and/or memory of the computer system.

Method 100 includes operation 160 to generate a set of white box time series models that are similar to the black box time series model. Generating the set of white box time series models may include generating a plurality of different white box time series models. In some embodiments, each white box time series model in the set of white box time series models is a different type of model.

Although the black box time series model may have unclear and/or inaccessible inner workings, there may be other time series models that have clear and/or accessible inner workings. For example, the white box time series models may be linear models with formulas and/or calculations that may be easily accessible. In some instances, white box time series models may include one or more classes of models. The one or more classes may be selected from autoregressive (AR) models, moving average (MA) models, and integrated (I) models. AR, MA, and I models may all be linear models. In some embodiments, the white box time series models may include combinations of multiple classes (or types) of models. For example, the white box time series models may include auto regressive moving average (ARMA) models and/or auto regressive integrating moving average (ARIMA) models. In some embodiments, the white box time series models may include other time series models such as a Holt-Winters forecasting model. Therefore, in some embodiments, the various types of white box time series models may include AR (auto regressive) models, MA (moving average) models, ARMA (auto regressive moving average) models, ARIMA (auto regressive integrating moving average) models, and/or Holt-Winters models.

In some embodiments, a plurality of types of white box time series models (for example, two or more different types of white box time series models) may make up the set of white box time series models. For example, the set of white box time series models may include an AR, MA, and Holt-Winters model. In another example, the set of white box time series models may include ARMA and ARIMA models. In some embodiments, the set of white box time series models may include an AR model, MA model, ARMA model, ARIMA model, and Holt-Winters model.

In some embodiments, the types of white box time series models that make up the set of white box time series models may be predetermined. For example, the system may have a predetermined group of white box time series models that may be used as the set of white box time series models. In some embodiments, the system may automatically select the plurality of types of time series models as the set of white box time series models. In some embodiments, a user may select the types of time series models for the set of white box time series models. For example, a user may be presented with a list of time series models (e.g., AR, MA, ARMA, ARIMA, and Holt-Winters) and the user may select multiple models from the list of time series models as the set of white box time series models. The list of time series models may include linear models, in some instances, as the linear models may have accessible inner workings and may be white box time series models.

In some embodiments, generating the set of white box time series models includes generating a set of model parameters for each of a plurality of types of white box time series models. This may result in a plurality of initial white box time series models. In some instances, the plurality of types of white box time series models includes AR, MA, ARMA, ARIMA, and/or Holt-Winters types of time series models. An AR model may have a single parameter "p." "P" may represent a number of lags that are used as predictors or the order of the autoregressive model. Therefore, for an AR model, generating the set of model parameters may include generating the "p" parameter. In an MA model, there may be a parameter "q" that represents a number of lagged forecast errors (or, put differently, the number of autoregressive (AR) terms). For an MA model, generating the set of model parameters may include generating the "q" parameter.

An ARMA model may include a combination of the AR model and the MA model, and thus may include both the "p" and "q" parameters. For an ARMA model, generating the set of model parameters may include generating the "p" and "q" parameters. An ARIMA model may include the AR model, the MA model, and the I (integrated) model and may include both the "p" and "q" parameters, as well as a parameter "d" that represents a number of nonseasonal differences needed for stationarity or stationarization. Therefore, for an ARIMA model, generating the set of model parameters may include generating the "p," "q," and "d" parameters. For a Holt-Winters model, the parameters may include an "$\alpha$" (representing smoothing), "$\beta$" (representing the length of a season), and "$\gamma$" (representing a number of periods in a season). Therefore, for a Holt-Winters model, generating the set of model parameters may include generating the "$\alpha$," "$\beta$," and "$\gamma$" parameters.

In some embodiments, depending on which types of white box time series models are used for the plurality of initial white box time series models (e.g., the plurality of types of white box time series models with their specific parameters), stationarization methods may be applied to the training data before the model is trained. A stationary time series model and stationary training data may not depend on the different times the time series was observed and may have constant properties (e.g., mean, variance, etc.). In time series, there may be trends such as seasonality that indicate that a time or season that the data was taken may affect the value of the time series. For example, if a time series depicted the average temperature over the course of a year, the average predicted temperature may change depending on the month. For example, months such as December, January, and February may have cold average temperatures, whereas months such as June, July, and August may have warm average temperatures. These trends may be seasonality trends, as the value of the time series (in this example, the average temperature) is affected by which month the data was taken from. Therefore, certain time series datasets may need to be stationarized to become stationary before they are trained, in order to accurately train the model.

In some instances, because the white box time series models (e.g., AR, MA, ARMA, etc.) may be linear models, they may be stationary time series models. However, in some instances, the time series data that will be used to train the model(s) may not initially be stationary. Therefore, before training the model, the training data (e.g., time series data) may need to become stationary to remove dependence on the times the data was observed. For example, models like the AR, MA, and ARMA models may not have stationarization built into the model. Therefore, stationarization methods may be applied to the training data in order to create a stationary time series.

In some embodiments, stationarization methods include at least seasonal differencing. Differencing may be a data transform technique used to convert non-stationary time series data into stationary time series data. In some instances, seasonality may be a common trend that occurs in time series data. Therefore, to stationarize a time series dataset, seasonal differencing may be applied to the data to remove seasonality from the time series.

In some embodiments, certain white box time series models may have stationarization methods built into the model and a separate stationarization step may not be needed. For instance, the integrated (I) portion of the ARIMA model may include a preprocessing procedure that stationarizes the time series model (if needed). Therefore, and ARIMA model may include stationarization within the model itself and may not need additional stationarization methods applied to the model.

In some embodiments, generating the set of white box time series models includes training each of the initial white box time series models using the training data and the set of model parameters. This may result in a plurality of trained white box time series models. After the initial set of white box time series models are determined (for example, by identifying and establishing the various parameters for each white box time series model), the training data used to train the black box time series model (for example, the training data received in operation 150) may also be used to train each of the initial white box time series models. In some embodiments, as discussed herein, the training data may be stationarized before being used to train the white box time series models. In some embodiments, stationarization of the training data may be included in the training process. In some embodiments, the initial white box time series models may be trained using conventional training methods. In some embodiments, each of the initial white box time series models (e.g., AR, MA, ARMA, ARIMA, and/or Holt-Winters models) may be trained separately. In some embodiments, one or more of the initial white box time series models may be trained simultaneously.

In some instances, it may be determined whether any models from the plurality of trained white box time series models did not complete training successfully. For instance, the model may not have properly learned from the training data. In some embodiments, determining whether any models did not complete training successfully includes determining whether any models (from the plurality of trained white box time series models) include non-stationary coefficients. As discussed herein, in order to properly fit and train the white box time series models (for example, linear time series models), the time series data may need to be stationary. However, oftentimes time series data is not stationary and may have various trends and/or seasonality. In some embodiments, if the time series data is not properly stationarized then the white box time series model(s) may not be trained successfully.

As discussed herein, certain white box time series models may include stationarization as a part of their model and other white box time series models may not include stationarization, and the training data may be stationarized prior to training the model. Therefore, instances where the training data may not have been successfully stationarized prior to training the white box time series models may result in one or more of the models that do not include stationarization having coefficients that are non-stationary and thus having unsuccessful training. However, in these embodiments, the white box time series models including stationarization may have successful training and stationary coefficients, as these models may not need stationary training data.

In some embodiments, one or more issues may have occurred while training one or more models that include stationarization (for example, ARIMA models). This may result in a white box time series model (e.g., an ARIMA model) without properly stationarized coefficients.

If there are models that did not complete training successfully, those models may be removed from the plurality of white box time series models. For instance, the white box time series models may be stationary models. Therefore, white box time series model(s) with non-stationary coefficients may be completely inaccurate and full of errors. These models may be removed from the set of white box time series models to prevent issues and increase accuracies of any explanations generated based on the white box time series models. The remaining white box time series models that were trained successfully may be referred to as a reduced plurality of trained white box time series models.

In some embodiments, generating the set of white box time series models includes identifying an overall forecast time period of the black box time series model. The overall forecast time period may be the complete time period that the black box time series model forecasted data for. For example, a black box time series model may predict the average household income for January 2022, February 2022, March 2022, April 2022, May 2022, June 2022, July 2022, August 2022, September 2022, October 2022, November 2022, December 2022, and January 2023. In this example, the specific time instance may be a household income of $70,000 in June 2022. The overall forecast time period, in this example, may be from January 2022 to January 2023, as that is the overall time period that the black box model forecasted data through. In some embodiments, if the black box time series model forecasted data over a certain time period (the overall forecast time period), each white box time series model (from the reduced plurality of trained white box time series models) may also forecast data over the same overall forecast time period. For example, the white box time series models would also forecast average household incomes from January 2022 to January 2023. This may help determine how each white box time series model performs over the whole overall forecast time period (compared to the black box time series model). In some instances, each time series model (for example, black box and/or white box) may be depicted as a visualization (for example, a graph).

Figure 4:
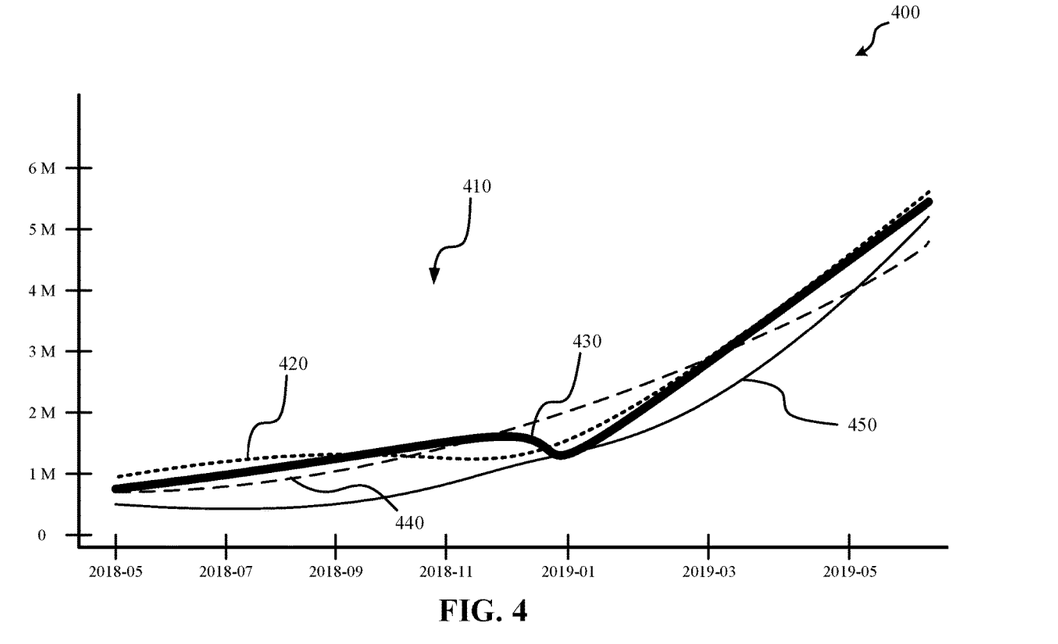
FIG. 4 depicts a schematic diagram of visual representations of a set of white box time series models, according to some embodiments.

In some embodiments, generating the set of white box time series models includes generating output visualizations for each white box time series model. The output visualizations may help depict the similarities and differences between each model and may help identify the preferred white box time series model, in some instances. The output visualizations may range at least the overall forecast time period for each white box time series model (from the plurality of trained white box time series models). For instance, a graph (such as a line graph) may be generated for each white box time series model. For example, FIG. 4 depicts visualizations (in this example, line graphs) for each white box time series model in the set of white box time series models. Each visualization may be depicted on a same graph, in some instances.

In some embodiments, when some models are not trained successfully and are removed from the plurality of trained white box time series models (resulting in the reduced plurality of trained white box time series models), the output visualizations may be generated for each white box time series model from the reduced plurality of trained white box time series models. Put differently, output visualizations may not be generated for any of the white box time series models that were not trained successfully.

Method 100 includes operation 170 to select a preferred white box time series model from the set of white box time series models. In some embodiments, selecting a preferred white box time series model includes comparing each white box time series model to the black box time series model. Comparing the white box time series model(s) to the black box time series model may include determining the similarities and differences between each white box time series model and the black box time series model. In some embodiments, comparing the white box time series model may include comparing the overall white box time series model (for example, each predicted time instance of the white box time series model) to the overall black box time series model (for example, each predicted time instance of the black box time series model) and then comparing the predicted data point at the specific time instance for the white box time series model to the specific time instance of the black box time series model. Therefore, in some embodiments, the selecting may be based on at least each white box time series model as a whole and each white box time series model at the predicted time instance. Put differently, when selecting a preferred white box time series model, each white box time series model may be compared to the black box time series model at the specific time instance that an explanation will be generated for. In addition, each white box time series model may be compared to the black box time series model as a whole.

For example, using the set of time series models 410 depicted in FIG. 4, the predicted time instance may be at time March 2019. In this example, the black box time series model 430 (FIG. 4) may have predicted that there is $3 Million of in-game currency spent per day in March of 2019. When looking at the plurality of white box time series models, both white box time series model 420 and 440 appear to be closest to black box time series model 430 at the specific time instance of March 2019. However, in this example, white box time series model 440 appears to be different from black box time series model 430 everywhere but times through November 2018 and at March 2019. White box time series model 420 appears to be more similar to black box time series model 430 when looking at the model both at the specific March 2019 time instance and as a whole. White box model 450 appears to be different from the black box time series model 430 everywhere except for January 2019.

In an example where January 2019 is the predicted time instance, white box time series model 450 may appear to be the preferred white box time series model at the specific time instance. However, when comparing model 450 to the black box time series model 430 as a whole, white box time series model 450 is only similar to black box time series model 430 at the January 2019 point and is different from black box time series model 430 everywhere else. Therefore, in this example, even though white box time series model 450 is the most similar to black box time series model 430 at the specific time instance of January 2019, white box time series model 450 may not be the preferred time series model due to its differences from black box time series model 430 as a whole.

In some embodiments, selecting the preferred white box time series model includes determining a time instance prediction error for each white box time series model (from the set of white box time series models) for the predicted time instance. The time instance prediction error may be the error at the specific predicted time instance. For example, the time instance prediction error may be how far off the white box time series model is from the black box time series model (e.g., the difference between the white box model and the black box model) at the specific time instance. For example, looking again at FIG. 4, white box time series models 420 and 440 may both have a low time instance prediction error at the time instance March 2019 and white box time series model 450 may have a higher time instance prediction error.

In some embodiments, selecting the preferred white box time series model includes determining a global prediction error for each white box time series model based on the black box time series model. The global prediction error may be the overall error of each white box time series model over the overall forecast time period. In some embodiments, finding the global prediction error may include finding the error at each forecasted data point, and then averaging the errors to determine the overall error. For example, if a white box time series model predicted five forecasted data point, and the error at each point was 0.05, 0.2, 0.1, 0.12, and 0.08, the global prediction error for the white box time series model may be 0.11.

In some embodiments, selecting the preferred white box time series model includes analyzing the time instance prediction error and the global prediction error for each white box time series model. Analyzing the time instance prediction error and the global prediction error may include comparing the errors for each model and/or identifying any trends in the errors. For example, one white box time series model may have a lowest time instance prediction error and a lowest global prediction error. In such instances, the white box time series model with both a lowest time instance prediction error and global prediction error may be selected as the preferred white box time series model.

In some instances, analyzing the time instance prediction error and the global prediction error may include weighting the time instance prediction error and the global prediction error and determining an overall weighted error for each white box time series model. As discussed herein, there may be instances where a white box time series model may have a low (or lowest) time instance prediction error but a higher global prediction error, or vice versa. In such instances, even if a white box time series model was accurate in predicting a specific time instance, if the model was not accurate in predicting any other time instances, the explanation or reasoning that the white box time series model may have for predicting the specific time instance may not be the same explanation the black box time series model had for predicting the same/similar specific time instance. Therefore, in some embodiments, weighting the errors and determining an overall weighted error for each white box time series model may help balance the two errors and prevent a white box time series model from being selected if it was only accurate at the specific time instance (or if it was not at all accurate at the specific time instance).

For example, the set of white box time series models may include three different models, an AR model, MA model, and ARIMA model. In this example, the AR model may have a time instance prediction error of 0.05 and a global prediction error of 0.22. The MA model may have a time instance prediction error of 0.15 and a global prediction error of 0.20. The ARIMA model may have a time instance prediction error of 0.11 and a global prediction error of 0.21. In this example, each global prediction error (0.22, 0.20, and 0.21) is relatively similar. Therefore, in this example, the time instance prediction error may be weighted higher than the global prediction error. In this example, the time instance prediction error may have a weight of 5, where the global prediction error may have a weight of 1. Therefore, the overall prediction error, in this example, for the AR model is 0.47, for the MA model is 0.95, and for the ARIMA model is 0.76. In this example, the AR model has the lowest overall weighted error, even though it has the highest global prediction error.

In another example, the set of white box time series models may include a Holt-Winters model, an ARIMA model, and an ARMA model. The Holt-Winters model may have a time instance prediction error of 0.2 and a global prediction error of 0.2. The ARIMA model may have a time instance prediction error of 0.25 and a global prediction error of 0.1. The ARMA model may have a time instance prediction error of 0.1 and a global prediction error of 0.25. In this example, the time instance prediction error may have a weight of 3 (for example, because the explanation may be generated for the specific time instance) and the global prediction error may have a weight of 2. Therefore, the overall prediction error for the Holt-Winters model may be 1, for the ARIMA model may be 0.95, and the ARMA model may be 0.8. In this example, although the Holt-Winters model may have never had the highest error, the ARMA model may have the lowest overall weighted error due to its low time instance prediction error.

In some embodiments, selecting the preferred white box time series model includes identifying, based on the analyzing, the white box time series model with a minor error. In some embodiments, the minor error may be the lowest overall error. If a white box time series model has both the lowest overall error and the lowest global prediction error, it may have the lowest overall error and may be selected as the preferred white box time series model. In some instances, the overall error may be the total error. For example, using the above Holt-Winters, ARIMA, and ARMA example, the Holt-Winters model may have an overall error of 0.4, the ARIMA model may have an overall error of 0.35, and the ARMA model may have an overall error of 0.35. In some instances, such as this example, more than one model may have the same overall error. Therefore, in some embodiments, the errors may be weighted and an overall weighted error may be used. Thus, in some instances, the white box time series model with a minor error may be the white box time series model with a lowest overall weighted error. Again, using the above Holt-Winters, ARIMA, and ARMA example, the ARMA model may be selected as the preferred white box time series model, as it has the lowest overall weighted error.

Method 100 includes operation 180 to generate an explanation for the predicted time instance. An explanation may include reasonings and/or observances that may have contributed to the predicted time instance. For example, there may be notable trends, seasonalities, residuals, and/or errors of the time series data that may have resulted in the predicted time instance. In some embodiments, the generated explanation is based on the preferred white box time series model, the training data, and the black box time series model.

In some embodiments, generating the explanation for the black box time series model may include analyzing behavior of the preferred white box time series model. For instance, the seasonal differencing and/or stationarization operations may be inverted for the preferred white box time series model so that the various trends and seasonalities are shown for the trained model. The preferred white box time series model (or the visualization (e.g., graph) of the white box time series model) may be analyzed for at least trends and seasonalities. The trends and seasonalities of the preferred white box time series model (and the training data) may be used to identify any trends and seasonalities in the black box time series model.

In some instances, there may be previous data points (either from the training data or from the forecasted data) that may affect (for example, largely impact) the predicted time instance. For example, if the black box time series model is predicting the average temperature each month, the average temperature that was predicted for March (or, for example, the end of March) may have a large impact on the temperature prediction for April. For instance, if March is predicted to be unseasonably cold, April might also be predicted to be unseasonably cold. Therefore, an unseasonably cold prediction for March $28^{th}$, for example, may impact what is predicted for April $2^{nd}$. These impactful data points may be a part of the explanation for the predicted time instance, in some embodiments.

In some embodiments, generating the explanation for the black box time series model includes determining at least a trend, seasonality, and residual of the black box time series model based on the analyzed behavior of the preferred white box time series model. Seasonality of the black box time series model may include seasonal variations or trends of the time series.

Trends of the black box time series model may include any other trends of the time series. For instance, there may be long-term movements or trends. For example, using the previous temperature example, there may be a long-term movement of colder temperatures in the winter. Put differently, each winter (or every few winters) may have slightly colder temperatures than the previous few winters. Another trend may be cyclic variations in the time series. Cyclic variations may include any trends or changes in cycles of the time series. For example, colder temperatures when the sun is down (i.e., it is dark out) and warmer temperatures when the sun is up (i.e., it is light out) may be a cyclic trend or cyclic variation. In some instances, another possible trend may be irregular variations or movements. For example, if January $15^{th}$ had an average temperature of 54 degrees Fahrenheit, when the rest of January had average temperatures ranging 15-30 degrees Fahrenheit, January $15^{th}$ may be an irregular variation.

Residuals of the black box time series model may be a difference between the observations (or what was expected) for the model and what was predicted for the model. For example, for a time series model predicting average temperatures, it may be expected that the winter months are colder than the summer months. However, in this example, the black box time series model may predict that in February, the temperature is relatively warm. The prediction may be different than what was expected and thus may have a residual error.

In some embodiments, the explanation for the black box time series model includes the seasonality, trends, residuals, error, and/or key data points. These components of the explanation may demonstrate why the black box time series model predicted the value it did at the predicted time instance.

Figure 5:
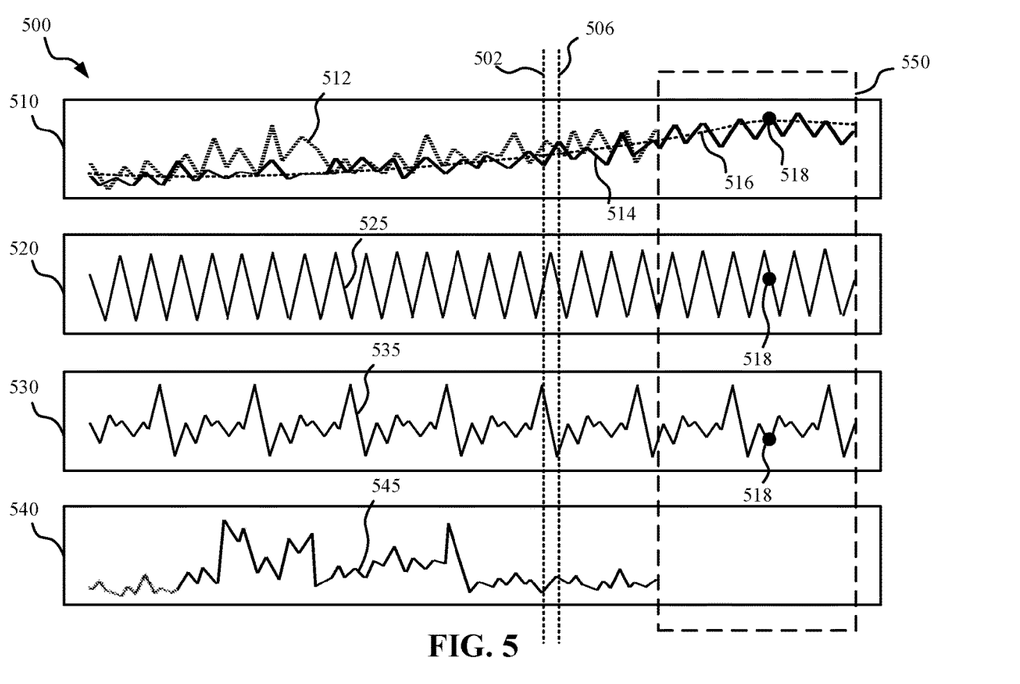
FIG. 5 depicts a schematic diagram of an example explanation of a prediction made by a black box time series model, according to some embodiments.

In some embodiments, generating the explanation for the black box time series model includes generating a visualization of the black box time series model. For instance, one or more graphs and/or schematic diagrams may be generated to depict the explanation. In some instances, the visualization of the black box time series model may include at least a first visualization of the trend, a second visualization of the seasonality, and a third visualization of the residual. For example, the explanation may include a graph depicting the trends of the black box time series model (for example, the time series models forecasted by the black box time series model), a graph depicting the seasonality of the black box time series model, and/or a graph depicting the residual error of the black box time series model. FIG. 5 depicts an example explanation 500.

Figure 2:
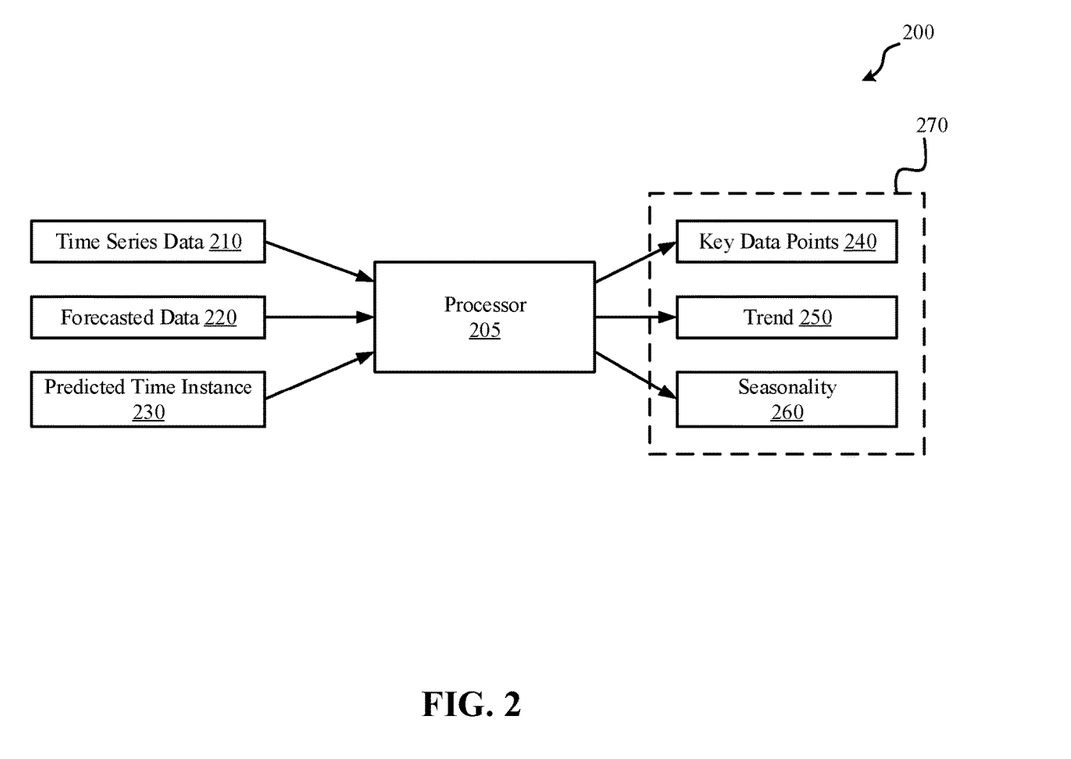
FIG. 2 depicts a schematic diagram of various inputs and outputs for explaining predictions made by black box time series models, according to some embodiments.

Referring to FIG. 2, a schematic diagram 200 of various inputs and outputs for explaining predictions made by black box time series models is depicted, according to some embodiments. In some embodiments, method 100 is executed by processor 205. The processor 205 may be on or connected to a computer system (such as system 600), in some instances. Processor 205 may execute a method (e.g., method 100 (FIG. 1)) to generate explanations for the predicted time instance forecasted by the black box time series model.

In some embodiments, time series data 210, forecasted data 220, and the specific predicted time instance 230 may be inputted into the processor 205. The time series data 210 may be the training data used to train the black box time series model. In some embodiments, time series data 210 is obtained in operation 150 (FIG. 1). The forecasted data 220 may be the time series data, or time instances, predicted using the black box time series model. In some embodiments, the forecasted data 220 is predicted in operation 130 (FIG. 1). The predicted time instance 230 may be a single piece of forecasted data 220. In some instances, a single predicted time instance 230 is selected from the forecasted data 220 for explanation (for example, in operation 140 (FIG. 1)). Put differently, the system may want to explain the prediction of a single time instance 230 from the plurality of time instances that may make up the forecasted data 220. In some embodiments, forecasted data 220 includes a single data point and the predicted time instance 230 is the same as the forecasted data 220.

In some embodiments, processor 205 generates and outputs an explanation 270. In some embodiments, the explanation 270 includes key data points 240 for the black box time series model, a trend 250 of the black box time series model and the forecasted data 220, and a seasonality 260 of the black box time series model and the forecasted data 220. Key data points 240 may be time series data points that have a significant impact on the predicted time instance 230. For example, when predicting the household income in March of 2022, the household income in December 2021 may have a significant impact on the income in March of 2022 because of end-of-year raises. If no end-of-year raise is given (or forecasted to be given) in December, then the household income in March may be lower than expected (for instance, than if a raise was given). Trends 250 of the black box time series model may include any patterns that occur for the time series. For example, the household income may be increasing each year. Seasonalities 260 of the black box time series model may include patterns in the times/seasons that things occur. For example, the end-of-year raises in December may be a seasonality. A household income in December may typically be higher than the household income in November. The explanation 270 is further discussed herein and depicted in FIG. 5.

Figure 3:
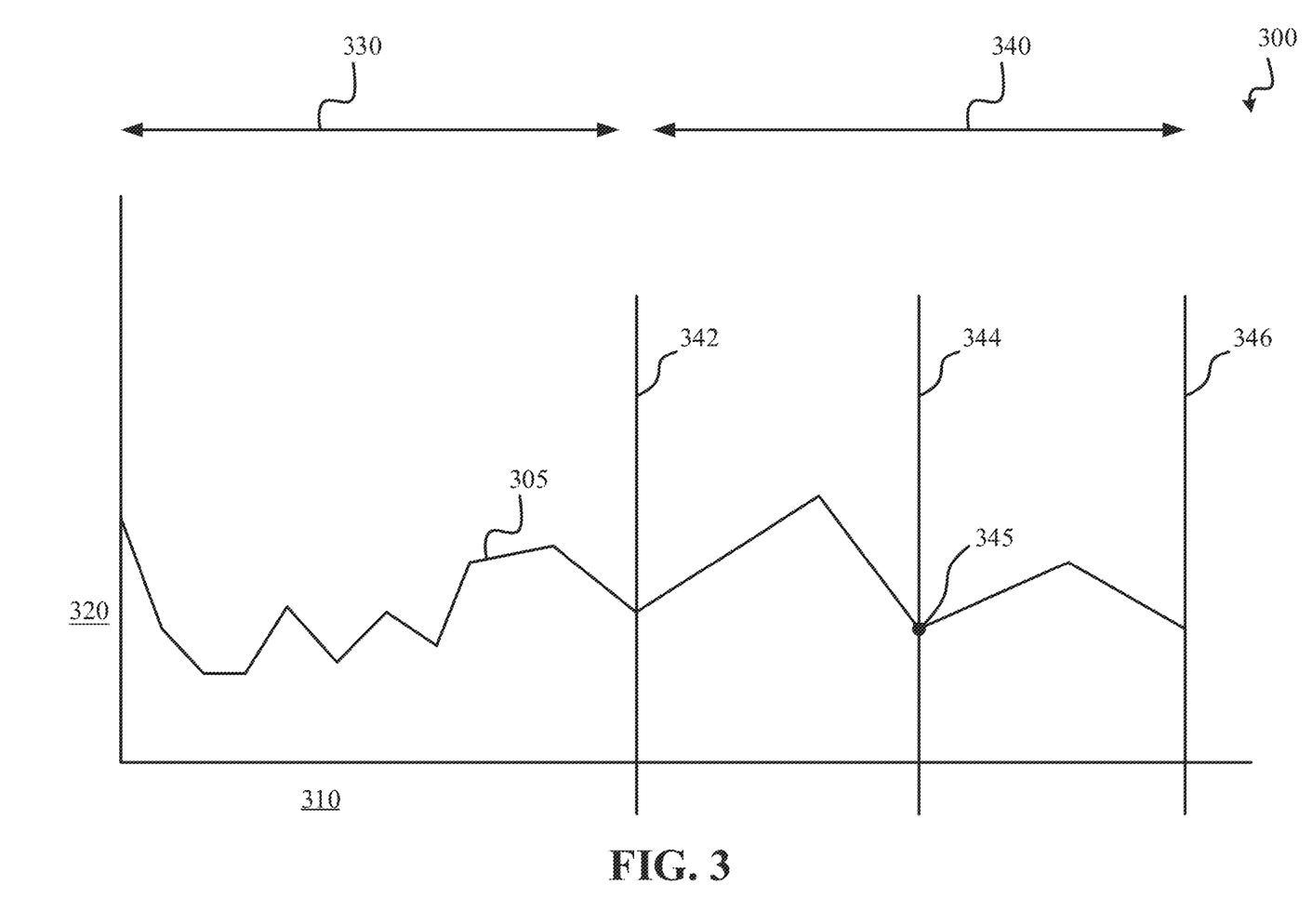
FIG. 3 depicts a schematic diagram of a visual representation of forecasting done by a black box time series model, according to some embodiments.

Referring to FIG. 3, a schematic diagram of a visual representation 300 of forecasting done by a black box time series model is depicted, according to some embodiments. The visual representation 300 may include a graph 305 of the time series data. The graph 305 of the time series data may include the time series data used to train the black box time series model (referred to herein as the training data portion 330) and the time series data predicted using the trained black box time series model (referred to herein as the forecasted data portion 240). For example, data about the average temperature in January for each year from 1980-2020 may have been used to train the black box model and may be depicted as training data portion 330. In this example, data may be predicted for the average temperature in January from 2021-2040 and may be depicted as forecasted data portion 340. In some instances, the x-axis 310 of the graph represents a time component and the y-axis 320 of the graph may represent a second component (for example, household income, temperature, in-game currency, storage quantities, etc.). Continuing the above example, the x-axis 310 of the graph may be the year (e.g., January 1990, 1991, 1992, etc.) and the y-axis may be the temperature.

In some embodiments, portion 330 of the graph 305 is a visual representation of the training data for the black box model. The training data portion 330 of the black box model may include training data that was used to train the black box time series model. In some embodiments, portion 340 of the graph 305 is a visual representation of the forecasted data for the black box time series model. The forecasted data portion 340 of graph 305 may include the data that the black box time series model predicted will occur. In some embodiments, times 342, 344, and 346 are all forecasted times that correspond to three forecasted data points of the graph 305. For example, 342 may be January 2021, 344 may be January 2030, and 346 may be January 2040. Data point 345 at time 344 may be the forecasted data point that is selected for explanation. For example, data point 345 may be an average temperature of 20 degrees Fahrenheit in January 2030. This data point 345 may be referred to herein as the predicted time instance.

Referring to FIG. 4, a schematic diagram of visual representations 400 of a set of white box time series models is depicted, according to some embodiments. In some embodiments, the visual representation 400 includes a plurality of graphs 410 corresponding to each white box time series model 420, 440, and 450 and, in some instances, the black box time series model 430. The graphs for each time series model may be referred to herein as time series models 410. The time series models 410 may include at least white box time series model 420, white box time series model 440, white box time series model 450, and black box time series model 430.

In the example visual representation 400, the time series models 410 may be forecasting amounts of in-game currency at various times in the time series. In visual representation 400, white box time series models 420 and 440 and black box time series model 430 are similar and do not differ much from each other from approximately time May 2018 through approximately time October 2018. After time October 2018, each of the white box time series models 420, 440, and 450 appear to diverge more from each other. Each of the white box models 420, 440, and 450 may be compared to the black box model 430 to determine which white box model is the preferred white box model. For instance, white box time series model 450 appears to differ significantly from black box time series model 430. White box time series models 420 and 440 appear to be more similar to black box time series model 430, however, white box time series model 440 appears to be similar to black box model 430 at approximately times May through September 2018 and March 2019, and appears to diverge the rest of the time. White box time series model 420 appears to be the most similar to black box time series model 430.

At the specific time instance of January 2019, White box time series model 450 is most similar to black box time series model 430. If the preferred white box time series model was selected based on just the specific time instance, white box time series model 450 may be determined to be the preferred time series model at time instance January 2019. However, when the preferred white box time series model is selected based also on the models as a whole, white box time series model 450 may not be selected as the preferred white box time series model, in this example, due to its differences compared to black box time series model 430.

Referring to FIG. 5, a schematic diagram of an example explanation 500 of a prediction made by a black box time series model is depicted, according to some embodiments. In some embodiments, the explanation 500 of the prediction may be depicted as a visualization such as a graph, or graphs. Example explanation 500 includes a forecast and trend visualization 510, a seasonality visualization 520, a residual visualization 530, and an error visualization 540. Box 550 may depict the areas of each visualization that represent the future data (referred to herein as future data 550). In some embodiments, explanation 500 may also include key data points 502 and 506. In some embodiments, key data points 502 and 506 are data points that had a significant impact on forecasting the predicted time instance 518.

In some embodiments, the forecast and trend visualization 510 may include at least any trends of the black box time series model. In some embodiments, the forecast and trend visualization 510 may include forecasted data 514. In example explanation 500, forecast and trend visualization 510 includes the actual data 512, the forecasted data 514, and the trends 516. The forecasted data 514 may include the data that was forecasted by the time series model. The actual data 512 may include the actual time series data that occurred. For example, the black box time series model may have predicted data (i.e., forecasted data 514). However, between the time the data was forecasted and the explanation 500 was generated, time may have passed and actual data 512 may have occurred. Therefore, in some instances, the system may have access to actual data 512 and may be able to depict the actual data 512 and compare it to the forecasted data 514. In some instances, the forecast and trend visualization may not include actual data 512. In forecast and trend visualization 510, actual data 512 only occurs through future data 550, as future data 550 includes forecasted data for times that may not have occurred yet, so actual data 512 may not exist.

In some embodiments, trends 516 shows the trend(s) of the forecasted data 514. In forecast and trend visualization 510, the trend 516 of the forecasted data 514 includes that the data increases while peaking at around predicted time instance 518. In some embodiments, predicted time instance 518 is the time instance that has been selected for explanation.

In some embodiments, seasonality visualization 520 includes the seasonality 525 of the forecasted data 514. In some embodiments, each trough to peak to trough may be a season. In the seasonality visualization 520, there may be at least 24 seasons depicted. Seasonality visualization 520 may include predicted time instance 518 and where in the seasonality trend predicted time instance 518 occurs. For example, in example explanation 500, predicted time instance 518 is towards the end of the season, during the downward trend. Further, seasonality visualization 520 may include a representation of key points 502 and 506 and their corresponding positions on the seasonality trend 525. In this example, key points 502 and 506 both occur at approximately the same trend, however key point 502 occurs in the earlier portion of the season, where key point 506 occurs at a similar point of the season as predicted time instance 518.

In some embodiments, residual visualization 530 may depict the residuals 535 (e.g., the difference between the observed value and the estimated value) between the expected data and the forecasted data 514. The expected data may be the data that, based on training data and observations, the black box time series model was expected to predict. The forecasted data 514 may be the data that the black box time series model actually predicted. The residual error 535 for the black box time series model appears to be relatively low, or at least moderately low, however there are multiple peaks throughout the residual 535 where the residual error appears to be high. The residual error at the time of the predicted time instance 518 appears to be relatively low, which may indicate that the black box time series model predicted similar to what was expected at the predicted time instance 518.

In some embodiments, the error visualization 540 may depict the absolute error 545 of the forecasted data 514 (compared to the actual data 512). For instance, absolute error 545 may show the difference between forecasted data 514 and actual data 512. In some embodiments, the actual error visualization 540 may only occur when there is actual data 512. If there is no actual data 512, there may be no absolute error for the forecasted data 514, in some instances.

In some embodiments, the intersection points between key points 502 and 506 and the trends 516, the seasonality trend 525, and the residual 535 may be weighted. In some instances (not depicted), these intersections may be marked using circles or dots, and the weights may be denoted by the size of the circles on the intersection points. The weights may represent how much the key points 502 and 506 affect the predicted time instance. For example, key point 506 may significantly impact the prediction of time instance 518 (e.g., because it is also a peak) and key point 502 may not impact the prediction of time instance 518 quite as much. Therefore, in this example, key point 506 on the trend 525 line may have a larger weight than key point 502 on the trend 525 line and key point 506 may have a larger circle on the trend 525 line than key point 502.

In some embodiments, the explanation 500 may be used by the system and/or users of the system. For example, trend visualization 510 may be used to show that there is an overall rising trend to the data. Therefore, the black box time series model's prediction of time instance 518 may be higher than previous time series data points, such as at time instance 502, due to at least the trends of the forecasted data 514. Seasonality visualization 520 may show that there are seasonality trends for the data. Without having knowledge of the seasonality trends, a system and/or user may not understand why the black box time series model predicts some time series points as going down over short periods (for example at time instance 502) when the overall trend 516 of the forecasted data is going up. The error visualization(s) (i.e., residual visualization 530 and/or error visualization 540) may help show any weaknesses in the black box time series model. For instance, the residual visualization 530 and the error visualization 540 have various peaks where the black box time series model was not as accurate in its predictions. The residual visualization 530 and error visualization 540 may be particularly useful for debugging the black box time series model. For example, a large residual error (or even a large actual error) may indicate that there was a problem with the prediction at that particular time instance, and that time instance could be flagged for debugging. Further, trends and seasonalities may also help identify unexpected and/or inaccurate predictions to flag for debugging.

Figure 6:
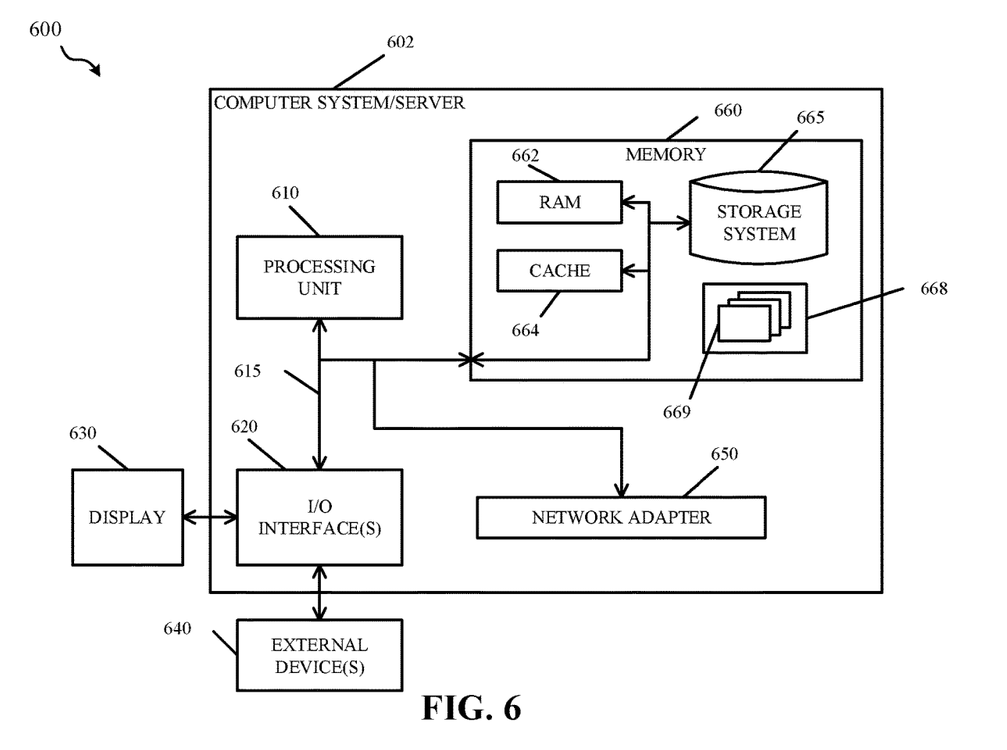
FIG. 6 depicts a block diagram of an example computer system environment, according to some embodiments.

Referring to FIG. 6, computer system 600 is a computer system/server 602 is shown in the form of a general-purpose computing device, according to some embodiments. In some embodiments, computer system/server 602 is located on the linking device. In some embodiments, computer system 602 is connected to the linking device. The components of computer system/server 602 may include, but are not limited to, one or more processors or processing units 610, a system memory 660, and a bus 615 that couples various system components including system memory 660 to processor 610.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 660 can include computer system readable media in the form of volatile memory, such as random-access memory (RAM) 662 and/or cache memory 664. Computer system/server 602 may further include other removable/non-removable, volatile/non-volatile computer system storage media. By way of example only, storage system 665 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 660 may include at least one program product having a set (e.g., at least one) of program modules that are configured to carry out the functions of embodiments of the disclosure.

Program/utility 668, having a set (at least one) of program modules 669, may be stored in memory 660 by way of example, and not limitation, as well as an operating system, one or more application programs, other program modules, and program data. Each of the operating system, one or more application programs, other program modules, and program data or some combination thereof, may include an implementation of a networking environment. Program modules 669 generally carry out the functions and/or methodologies of embodiments of the invention as described herein.

Computer system/server 602 may also communicate with one or more external devices 640 such as a keyboard, a pointing device, a display 630, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 620. Still yet, computer system/server 602 can communicate with one or more networks such as a local area network (LAN), a general wide area network (WAN), and/or a public network (e.g., the Internet) via network adapter 650. As depicted, network adapter 650 communicates with the other components of computer system/server 602 via bus 615. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a black box time series model;
   receiving training data for the black box time series model;
   training the black box time series model using the training data received for the black box time series model;
   predicting one or more time instances using the black box time series model, resulting in predicted data;
   selecting a predicted time instance from the predicted data;
   generating a set of white box time series models based on the black box time series model;
   selecting a preferred white box time series model from the set of white box time series models based on a difference between each white box time series model and the black box time series model;
   analyzing behavior of the preferred white box time series model; and
   generating, based on the analyzed behavior and the training data for the black box time series model, an explanation illustrating why the black box time series model forecasted the predicted time instance, wherein generating the set of white box time series models comprises:

generating a set of model parameters for each of a plurality of types of white box time series models, resulting in a plurality of initial white box time series models; and training each of the initial white box time series models using the training data for the black box time series model, the predicted data and the set of model parameters, resulting in a plurality of trained white box time series models, wherein generating the explanation for the black box time series model comprises:

determining a trend, seasonality, and residual of the black box time series model based on the analyzed behavior of the preferred white box time series model; and generating a visualization of the black box time series model.

2. The method of claim 1, further comprising:
identifying an overall forecast time period of the black box time series model; and
generating output visualizations ranging at least the overall forecast time period for each white box time series model from the plurality of trained white box time series models.

3. The method of claim 2, further comprising:
determining whether any models from the plurality of trained white box time series models did not complete training successfully; and
removing the models from the plurality of white box time series models that did not complete training successfully, resulting in a reduced plurality of trained white box time series models, wherein:
the output visualizations are generated for each white box time series model from the reduced plurality of trained white box time series models.

4. The method of claim 3, wherein determining whether any models from the plurality of trained white box time series models did not complete training successfully comprises:
determining whether any models from the plurality of trained white box time series models comprise non-stationary coefficients.

5. The method of claim 2, further comprising:
applying stationarization methods to the training data of the black box time series model.

6. The method of claim 5, wherein the stationarization methods comprise at least seasonal differencing.

7. The method of claim 2, wherein the types of white box time series models comprises at least AR, MA, ARMA, ARIMA, and Holt-Winters models.

8. The method of claim 1, wherein the difference between each white box time series model and the black box time series model includes at least an overall error for each white box time series model.

9. The method of claim 1, wherein the difference between each white box time series model and the black box time series model includes at least an overall weighted error for each white box time series model, from the set of white box time series models, for the predicted time instance.

10. The method of claim 9, wherein selecting the preferred white box time series model comprises:
determining a time instance prediction error for each white box time series model from the set of white box time series models, for the predicted time instance;
determining a global prediction error for each white box time series model from the set of white box time series models based on the black box time series model;
weighting the time instance prediction error and the global prediction error;
determining the overall weighted error for each white box time series model; and
identifying the white box time series model with the lowest overall weighted error.

11. The method of claim 1, wherein the visualization of the black box time series model comprises at least a first visualization of the trend, a second visualization of the seasonality, and a third visualization of the residual of the black box time series model.

12. A system having one or more computer processors, the system configured to:
identify a black box time series model;
receive training data for the black box time series model;
train the black box time series model using the training data received for the black box time series model;
predict one or more time instances using the black box time series model, resulting in predicted data;
select a predicted time instance from the predicted data;
generate a set of white box time series models based on the black box time series model;
select a preferred white box time series model from the set of white box time series models based on a difference between each white box time series model and the black box time series model;
analyze behavior of the preferred white box time series model; and
generate, based on the analyzed behavior and the training data for the black box time series model, an explanation illustrating why the black box time series model forecasted the predicted time instance, wherein generating the set of white box time series models comprises:
generating a set of model parameters for each of a plurality of types of white box time series models, resulting in a plurality of initial white box time series models;
training each of the initial white box time series models using the training data, the predicted data and the set of model parameters, resulting in a plurality of trained white box time series models, wherein generating the explanation for the black box time series model comprises:
determining a trend, seasonality, and residual of the black box time series model based on the analyzed behavior of the preferred white box time series model; and
generating a visualization of the black box time series model.

13. The system of claim 12, further comprising:
identifying an overall forecast time period of the black box time series model; and
generating output visualizations ranging at least the overall forecast time period for each white box time series model from the plurality of trained white box time series models.

14. The system of claim 13, further configured to:
determine whether any models from the plurality of trained white box time series models did not complete training successfully; and
remove the models from the plurality of white box time series models that did not complete training successfully, resulting in a reduced plurality of trained white box time series models, wherein:
the output visualizations are generated for each white box time series model from the reduced plurality of trained white box time series models.

15. The system of claim 12, wherein the difference between each white box time series model and the black box time series model includes at least an overall error for each white box time series model.

16. The system of claim 12, wherein the difference between each white box time series model and the black box time series model includes at least an overall weighted error for each white box time series model, from the set of white box time series models, for the predicted time instance.

17. A computer program product comprising a computer readable storage medium having program instructions embodied therewith, the program instructions executable by a server to cause the server to perform a method, the method comprising:
  identifying a black box time series model;
  receiving training data for the black box time series model;
  training the black box time series model using the training data received for the black box time series model;
  predicting one or more time instances using the black box time series model, resulting in predicted data;
  selecting a predicted time instance from the predicted data;
  generating a set of white box time series models based on the black box time series model;
  selecting a preferred white box time series model from the set of white box time series models based on a difference between each white box time series model and the black box time series model;
  analyzing behavior of the preferred white box time series model; and
  generating, based on the analyzed behavior and the training data for the black box time series model, an explanation illustrating why the black box time series model forecasted the predicted time instance, wherein generating the set of white box time series models comprises:
    generating a set of model parameters for each of a plurality of types of white box time series models, resulting in a plurality of initial white box time series models;
    training each of the initial white box time series models using the training data, the predicted data and the set of model parameters, resulting in a plurality of trained white box time series models, wherein generating the explanation for the black box time series model comprises:
    determining a trend, seasonality, and residual of the black box time series model based on the analyzed behavior of the preferred white box time series model; and
    generating a visualization of the black box time series model.

18. The computer program product of claim 17, further comprising
  identifying an overall forecast time period of the black box time series model; and
  generating output visualizations ranging at least the overall forecast time period for each white box time series model from the plurality of trained white box time series models.

19. The computer program product of claim 18, further comprising:
  determining whether any models from the plurality of trained white box time series models did not complete training successfully; and
  removing the models from the plurality of white box time series models that did not complete training successfully, resulting in a reduced plurality of trained white box time series models, wherein:
  the output visualizations are generated for each white box time series model from the reduced plurality of trained white box time series models.

* * * * *